L. M. NELSON.
PROPORTION DIVIDERS.
APPLICATION FILED SEPT. 1, 1908.

930,408.

Patented Aug. 10, 1909.

Inventor
L. M. Nelson.

Witnesses

UNITED STATES PATENT OFFICE.

LOUIS M. NELSON, OF DOUGLAS, WYOMING.

PROPORTION-DIVIDERS.

No. 930,408. Specification of Letters Patent. Patented Aug. 10, 1909.

Application filed September 1, 1908. Serial No. 451,275.

*To all whom it may concern:*

Be it known that I, LOUIS M. NELSON, citizen of the United States, residing at Douglas, in the county of Converse and State of Wyoming, have invented certain new and useful Improvements in Proportion-Dividers, of which the following is a specification.

The present invention relates to an improved instrument for use in proportional drafting, and the primary object of the invention is the provision of a device of this character which may be used with equal facility either for determining proportional distances or proportional areas.

The invention further contemplates a proportional divider that is always ready for any proportion without adjustment, and which can be easily manipulated and is simple in its construction so that it can be manufactured at a price that will not bar the average draftsman from its use.

Figure 1:
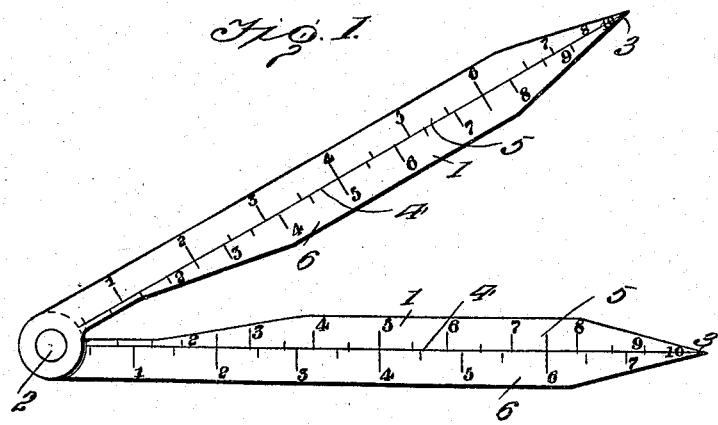
Figure 2:
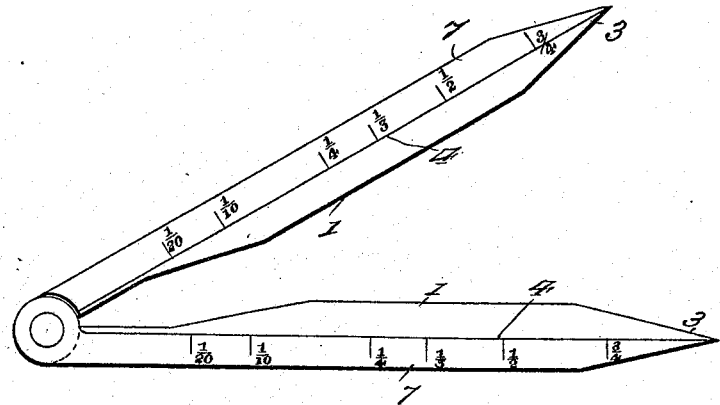

For a full understanding of the invention and the merits thereof and also to acquire a knowledge of the details of construction and the means for effecting the result, reference is to be had to the following description and accompanying drawings, in which:

Figure 1 is a plan view of one side of the dividers, and Fig. 2 is a similar view of the opposite side of the dividers.

Corresponding and like parts are referred to in the following description and indicated in all the views of the drawings by the same reference characters.

Specifically describing the present embodiment of the invention, the numerals 1 designate the two arms of the divider, the said arms having a flattened formation and being pivoted at one end, as indicated at 2, and pointed at the opposite end, as indicated at 3. The two arms are provided upon each of their faces with an axial line 4, extending from the point 3 to the pivot center. On one side of the dividers, as indicated in Fig. 1, the spaces upon opposite sides of the axial line 4 upon each of the arms are subdivided, respectively, by the graduations 5 into ten equal spaces, and by the graduations 6 into eight equal spaces, both sets of the graduations intersecting the axial line.

On the opposite side of the dividers, as indicated in Fig. 2, the arms are provided with the transverse graduations 7, intersecting the axial lines and designated by the characters 1/20, 1/10, 1/4, 1/3, 1/2 and 3/4. The distance from the pivot center to the graduation 7, marked 1/20, is equal to .2236 of the distance from the pivot center to the point 3, .2236 being the square root of 1/20. In a similar manner the distance from the pivot center to the graduation mark 1/10 is .3162 of the distance from the pivot center to the point 3, .3162 being the square root of 1/10; the distance from the pivot center to the graduation mark 1/4 .5 of the length of the arm, .5 being the square root of 1/4; the distance from the pivot center to the graduation mark 1/3, .5774 of the length of the arm, .5773 being the square root of 1/3; the distance from the pivot center to the graduation mark 1/2, .7071 of the length of the arm, .7071 being the square root of 1/2; and the distance from the pivot center to the graduation mark 3/4 being .8660 of the length of the arm, .8660 being the square root of 3/4.

In the use of the dividers should the draftsman be making drawings of a machine or like member to a certain scale, the pointed ends 3 of the arms may be placed upon the member being drawn and the distance between the corresponding graduations upon the arms measured by an ordinary divider. For instance, should the draftsman be making drawings to the scale of 1/2, the points of the ordinary divider would be placed upon the intersections of the graduations 5 marked 5 with the axial lines 4. In a similar manner any other scale might be taken with equal facility by placing the dividers upon the correct graduations. For determining proportional areas, as when drawing maps, the opposite side of the dividers shown in Fig. 2 would be used and the points 3 set on a given distance. For example, should it be desired to find the diameter of a pipe having 1/2 the cross sectional area of a twelve inch pipe, the points 3 would be set twelve inches apart and the distance between the intersecting points of the graduations 7 marked 1/2 with the axial lines 4, would be the required diameter of the pipe. In an exactly analogous manner the diameter of a pipe having 1/20, 1/10, 1/4, 1/3 or 3/4 of the cross sectional area of the twelve inch pipe might have been obtained. It will thus be obvious that the proportional dividers do not require any special adjustment and may be instantly set so as to be utilized for determining either proportional distances or proportional areas.

Having thus described the invention, what is claimed as new is:

Proportional dividers for determining proportional areas, the said dividers comprising a pair of complemental arms pivoted at one end and provided upon one side with axial lines and also with graduations intersecting the axial lines and designated by fractions, the distance between the various graduations and the pivot point bearing such a relation to the entire length of the arm as the square root of the fraction designating the graduation bears to one.

In testimony whereof I affix my signature in presence of two witnesses.

LOUIS M. NELSON. [L. S.]

Witnesses:
M. I. CHAPIN,
W. J. MARSCH.